United States Patent

Nauta

[15] 3,659,826
[45] May 2, 1972

[54] DEVICE FOR TREATING ONE OR MORE SUBSTANCES IN A VESSEL PROVIDED WITH AT LEAST ONE ROTATABLE STIRRING MEMBER

[72] Inventor: Constant Johan Nauta, Overveen, Netherlands

[73] Assignee: Nautamix Patent A.G., Zug, Switzerland

[22] Filed: Dec. 22, 1970

[21] Appl. No.: 100,575

[30] Foreign Application Priority Data

Dec. 30, 1969 Netherlands..........................6919610

[52] U.S. Cl..........................................................259/102
[51] Int. Cl. .........................................................B01f 7/00

[58] Field of Search.....................259/102, 5, 21, 40, 64, 118

[56] References Cited

UNITED STATES PATENTS

| 2,102,385 | 12/1937 | Schock | 259/102 |
| 3,109,633 | 11/1963 | Nauta | 259/102 |
| 3,114,622 | 12/1963 | Hardy | 259/102 |
| 3,482,823 | 12/1969 | Rechtin | 259/102 |

Primary Examiner—Robert W. Jenkins
Attorney—Arnold Robinson

[57] ABSTRACT

The present apparatus includes a vessel provided with a pair of agitators mounted to stir and mix substances in both vertical and horizontal directions.

10 Claims, 1 Drawing Figure

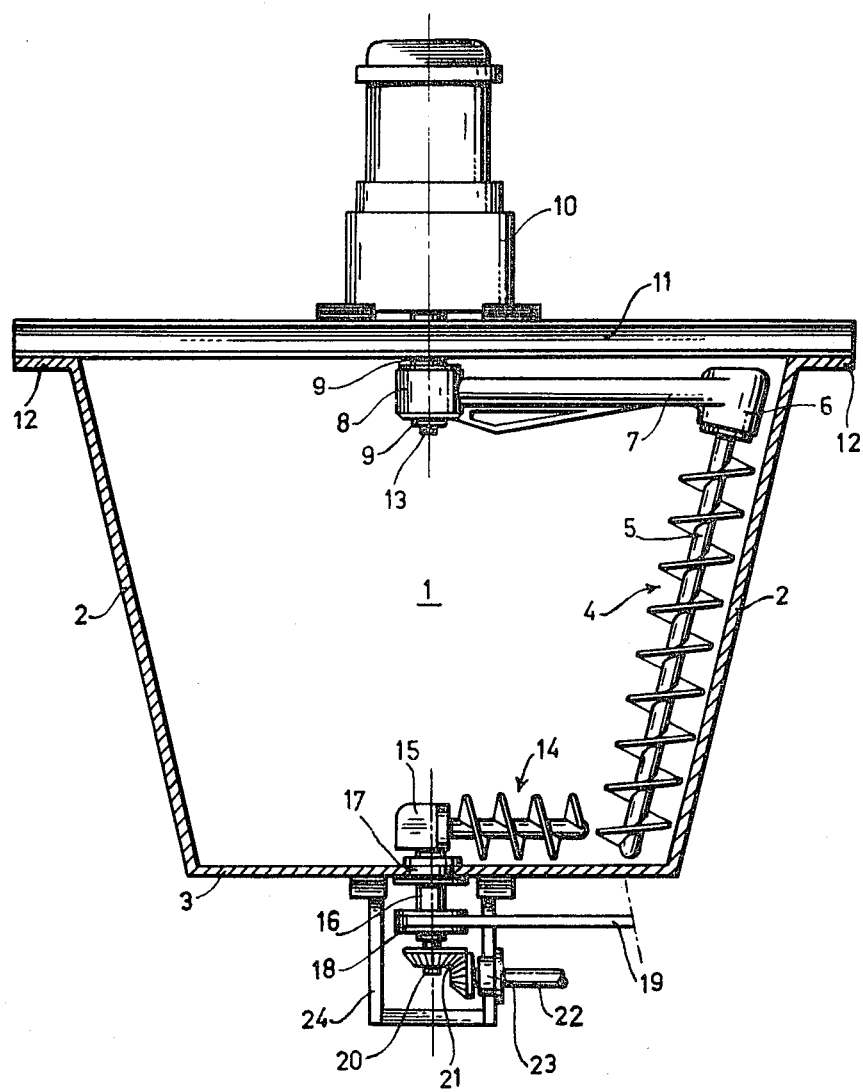

DEVICE FOR TREATING ONE OR MORE SUBSTANCES IN A VESSEL PROVIDED WITH AT LEAST ONE ROTATABLE STIRRING MEMBER

In accordance with the present invention, a vessel is provided with agitator means mounted eccentrically relative to the vertical axis of the vessel to revolve about the axis and stir the contents. In a preferred embodiment, the agitator means are provided with one or more blades arranged to rotate on a shaft to agitate the contents of the vessel adjacent the side wall thereof while the shaft revolves about the vertical axis of the vessel. These agitator means are positioned in a generally vertical direction in the vessel to stir and in the preferred embodiment simultaneously agitate the contents. Second agitator means are mounted in the vessel in a generally horizontal direction to revolve about the vertical axis of the vessel and agitate the contents. In a preferred embodiment, the second agitator means are provided with one or more blades arranged to rotate on a shaft to agitate the contents of the vessel adjacent the bottom wall thereof, generally in a horizontal direction while the shaft revolves around the vertical axis of the vessel to stir the contents in the same or different direction from that of the first agitator means.

In the preferred embodiment, the agitator means comprise a pair of screw type members. The first member is arranged adjacent and substantially parallel to the side wall of the vessel and the second member is arranged substantially parallel to the bottom wall of the vessel and for best results adjacent the bottom wall of the vessel. During agitation the first screw type member will tend to move the contents in vertical direction and the second screw type member will tend to move the contents in horizontal direction, while the contents will additionally be stirred by revolving both members about the vertical axis of the vessel. Excellent mixing is achieved when the interior of the vessel is provided with an inverted frusto-conical shape. If desired, a plurality of both types of agitator means may be employed in the mixing vessel and the stirring and agitation operations may be carried out by separate members each of which perform one operation.

In one embodiment of the invention, the screw type members are supported and driven at only one end and the unsupported end of one member extends into the vicinity of the path of the unsupported end of the second member.

Further details and advantages of the present invention may be readily understood by reference to the accompanying drawing which illustrates one preferred embodiment of the invention and in which:

The FIGURE is a vertical section through a mixing vessel illustrating a preferred embodiment of the invention.

The device comprises a vessel 1 which in the preferred embodiment has external and internal peripheral surface walls of inverted frusto-conical shape with a common vertical axis. The side wall 2 of the vessel 1 is integral with the bottom 3 of said vessel and the bottom has a comparatively large cross-section. The first agitator means in the preferred embodiment is a stirring-screw 4 which is arranged in the vessel with the upper end of the shaft 5 of said stirring screw being supported rotatably in a bearing in the outer end 6 of a radially outwardly extending hollow driven support arm 7. The arm 7 is provided at the opposite end with a support bushing 8 fixed on a hollow drive shaft 9. The axis of shaft 9 coincides with the vertical axis of the vessel 1. The unsupported lower end of said stirring screw lies in the vicinity of the bottom 3 of the vessel 1.

A conventional driving mechanism 10 is carried by cross supports 11 which bridge across the open top of the vessel 1, and are supported on the upper flange 12 of the side wall 2 of the vessel 1. Conventional drive and gear means (not shown) are arranged in the gear box 10 to rotate the support arm 7 and revolve the stirring screw about the vertical axis of the vessel. In the preferred embodiment shown, conventional drive and gear means (not shown) positioned in the hollow support arm 7 and box 10 in conjunction with a drive shaft 13 mounted coaxially in the hollow shaft 9 are employed for rotating the mixing screw 4 about its own axis which is positioned generally in a vertical direction. With this structure, the screw 4 may be revolved about the vertical axis of the vessel to stir and agitate the contents and the screw may be simultaneously rotated about its own axis to agitate the contents in the locality of the screw.

The second agitator means comprise an additional conveying screw 14 which corresponds to the stirring screw 4. The screw 14 is arranged in vessel 1, preferably adjacent the bottom 3 of the vessel and substantially parallel thereto. The shaft of screw 14 is rotatably mounted in a support bushing 15 fixed on a hollow drive shaft 16 which is mounted rotatably in a bearing 17 arranged in the bottom 3 of the vessel 1. The axis of drive shaft 16 coincides with the vertical axis of the vessel 1. The shaft 16 and screw 14 are both rotated about the vertical axis of the vessel by means of pulley 18 fixed to the shaft and the endless belt 19 connected to the pulley of a drive motor (not shown). A drive shaft 20 is rotatably mounted co-axially in the hollow drive shaft 16 and connected at one end by conventional gear means (not shown), to the shaft of screw 14. The second end of shaft 20 is connected to a drive shaft 22 by means of a bevel gear 21. The drive shaft 22 is rotatably supported in a bearing 23 mounted in a frame 24 fixed to the bottom 3 of the vessel 1. In operation the conveying screw 14 is revolved about the vertical axis of the vessel by the hollow drive shaft 16 and in the preferred embodiment, screw 14 is simultaneously rotated about its own axis by the drive shafts 20 and 22. The drive means for the stirring screw and the drive means for the additional conveying screw 14 may be adjusted so that said stirring screw and said additional conveying screw rotate at the same speed about their own axis, and simultaneously at the same speed about the vertical axis of the vessel 1.

In operation, the contents of the vessel are agitated when the agitator means revolve about the vertical axis of the vessel and actuation of the individual agitators by rotating the screws about their own axis will additionally agitate the contents in the locality of each screw. In the preferred embodiment, the agitator means comprise a conveying type of screw which has a tendency to move the contents along the length of the screw. The screws may be arranged to convey the contents toward or away from the unsupported end of the screw. In certain mixing operations, the agitator means may be used to merely stir the contents without the additional agitation achieved by rotating the screws about their own axis.

If desired, the vessel may be of an exact circular cylindrical shape, and the configuration and shape of the stirring member and the additional conveying members can be varied. Moreover, the additional conveying member may operate simultaneously as a stirring member arranged at a considerable distance from the bottom of the vessel or parallel to a conically shaped bottom of the vessel which slants downwards. More than one stirring member and additional conveying members may be arranged in one vessel. If desired, the arrangement may be such that, in operation, each stirring member and additional conveying members maintain the same relative position continuously.

It will be understood that the following claims are intended to cover all changes and modifications of the preferred embodiment of the invention, herein choosen for the purpose of illustration, which do not constitute a departure from the spirit and scope of the invention.

What is claimed is:

1. A mixing apparatus comprising a vessel, first agitator means eccentrically mounted in the vessel and disposed in a generally vertical direction, rotatable means for supporting said first agitator means, first driving means for rotating said support means to revolve said agitator means about the center of the vessel, second driving means for rotating said agitation means about its own axis, second agitator means disposed in the vessel in a generally horizontal direction, rotatable means for supporting said second agitation means, third driving means for rotating said support means to revolve said second agitator means about the center of the vessel and, fourth driving means for rotating said agitator means about its own axis.

2. A structure as specified in claim 1, in which the first and second agitator means comprise a screw type member.

3. A structure as specified in claim 2, in which the first agitator means are positioned adjacent the side wall of the vessel and substantially parallel thereto and in which the second agitator means are positioned adjacent the bottom wall of the vessel and substantially parallel thereto.

4. A structure as specified in claim 2, in which one end of the first agitator means is supported at the top of the vessel and the other end is unsupported at the bottom and in which one end of the second agitator means is supported at the center of the vessel and the other end is unsupported at the side.

5. A structure as specified in claim 4, in which the unsupported end of one agitator means is disposed in the vicinity of the path of the other agitator means.

6. A structure as specified in claim 1, in which the second agitator means comprise a screw type conveying member.

7. A structure as specified in claim 1, in which the first and second agitator means comprise screw type conveying members each of which members are arranged to convey toward the other member.

8. A structure as specified in claim 1, in which the vessel has an inverted frusto-conical shape.

9. A structure as specified in claim 1, in which the support means for said first and second agitator means are positioned on the vertical axis of the vessel.

10. A structure as specified in claim 1, in which the said first and second driver means are mounted on said support means for said first agitator means and in which said third and fourth driving means are mounted on said support means for said second agitator means.

* * * * *